(12) United States Patent
Chien et al.

(10) Patent No.: US 10,349,021 B2
(45) Date of Patent: Jul. 9, 2019

(54) PROJECTION DEVICE AND PROJECTION SYSTEM HAVING THE SAME

(71) Applicant: Coretronic Corporation, Hsin-Chu (TW)

(72) Inventors: Wen-Chang Chien, Hsin-Chu (TW); Pei-Yu Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 32 days.

(21) Appl. No.: 14/806,687

(22) Filed: Jul. 23, 2015

(65) Prior Publication Data

US 2016/0142690 A1 May 19, 2016

(30) Foreign Application Priority Data

Nov. 14, 2014 (CN) .......................... 2014 1 0648527

(51) Int. Cl.
| | |
|---|---|
| *H04N 9/31* | (2006.01) |
| *H04N 5/58* | (2006.01) |
| *H04W 4/80* | (2018.01) |
| *H04L 29/08* | (2006.01) |

(52) U.S. Cl.
CPC ......... *H04N 9/3179* (2013.01); *H04L 67/125* (2013.01); *H04N 5/58* (2013.01); *H04N 9/3194* (2013.01); *H04W 4/80* (2018.02)

(58) Field of Classification Search
CPC .................................................. H04N 9/3179
USPC ....................................................... 348/734
See application file for complete search history.

(56) References Cited

U.S. PATENT DOCUMENTS

| | | | |
|---|---|---|---|
| 8,751,049 B2 | 6/2014 | Linder et al. | |
| 8,866,976 B1 * | 10/2014 | Ozawa | H04N 9/3194 348/744 |
| 9,282,301 B1 * | 3/2016 | Cederlof | H04N 9/3147 |

(Continued)

FOREIGN PATENT DOCUMENTS

| | | |
|---|---|---|
| CN | 1573422 | 2/2005 |
| CN | 101395529 | 3/2009 |

(Continued)

OTHER PUBLICATIONS

"Office Action of China Counterpart Application," dated Feb. 23, 2017, p. 1-p. 10, in which the listed references were cited.

*Primary Examiner* — Jefferey F Harold
*Assistant Examiner* — Justin B Sanders
(74) *Attorney, Agent, or Firm* — JCIPRNET (57) ABSTRACT

A projection device and a projection system including the projection device are disclosed. The projection system includes an electronic device and the projection device. The electronic device provides a wireless signal. The projection device includes a wireless connection unit, a light sensor, a projection unit, an image control unit and a lamp base power interface. The wireless connection unit receives the wireless signal so as to provide an image control signal. The light sensor senses ambient light so as to provide a sensing control signal. The projection unit receives an image signal so as to project an image. The image control unit receives the image control signal and the sensing control signal so as to provide the image signal. The lamp base power interface electrically connects an external lamp stand power source to the projection device.

18 Claims, 4 Drawing Sheets

(56) References Cited

U.S. PATENT DOCUMENTS

| | | | |
|---|---|---|---|
| 2005/0017990 A1* | 1/2005 | Yoshida | G09G 3/3406 345/690 |
| 2011/0051020 A1* | 3/2011 | Kotani | H04N 9/3164 348/744 |
| 2012/0163828 A1 | 6/2012 | Lindberg et al. | |
| 2013/0002687 A1 | 1/2013 | Conti | |
| 2013/0163232 A1 | 6/2013 | Kasuga | |
| 2013/0222611 A1* | 8/2013 | Hsu | G06F 1/3231 348/207.1 |
| 2014/0022515 A1 | 1/2014 | Yamaguchi et al. | |
| 2014/0035964 A1 | 2/2014 | Kasuga | |
| 2014/0043516 A1 | 2/2014 | Baker | |
| 2014/0043544 A1 | 2/2014 | Kasuga | |
| 2014/0098303 A1 | 4/2014 | Kasuga | |
| 2014/0247288 A1* | 9/2014 | Zhang | G09G 3/3406 345/690 |
| 2015/0222842 A1* | 8/2015 | Kwong | H04N 9/3182 348/745 |
| 2016/0050736 A1* | 2/2016 | Hoang | F21V 5/04 315/151 |
| 2016/0085430 A1* | 3/2016 | Moran | G06F 3/04847 715/765 |

FOREIGN PATENT DOCUMENTS

| | | | | |
|---|---|---|---|---|
| CN | 101598887 | | 12/2009 | |
| CN | 201607814 | | 10/2010 | |
| CN | 102004379 | | 4/2011 | |
| CN | 202815404 | | 3/2013 | |
| JP | 2009258333 A | * | 11/2009 | H04N 5/74 |
| JP | 2009258333 A | * | 11/2009 | H04N 5/74 |

\* cited by examiner

PROJECTION DEVICE AND PROJECTION SYSTEM HAVING THE SAME

CROSS-REFERENCE TO RELATED APPLICATION

This application claims the priority benefit of Chinese application serial no. 201410648527.5, filed on Nov. 14, 2014. The entirety of the above-mentioned patent application is hereby incorporated by reference herein and made a part of this specification.

BACKGROUND OF THE INVENTION

Field of the Invention

The invention relates to a projection device, and particularly to a projection device having a lamp base power interface and a projection system including the projection device.

Description of Related Art

Conventional projection systems are mainly used for playing multimedia and giving a presentation at a meeting, and they are required not only to have good image clarity but also to save power. However, there are limitations on variation in functions and projection modes of the projection systems, and therefore, application of the projection systems is limited.

US Patent Publication No. 20140022515 discloses a projector having a light source, a light source controller driving the light source, a spatial light modulation device, a display controller, an irradiation optical system, a projection optical system, a light diffusion device and a light diffusion controller. US Patent Publication No. 20130002687 discloses a multimedia content receiving and broadcasting device in the shape of a conventional light bulb. US Patent Publication No. 20120163828 discloses an apparatus including a DC connector configured to connect to a DC connector in a light fixture, a network interface configured to operate as a node in a data communications network, and a communications interface for enabling communication between an environment adjacent to the light fixture and the data communications network. U.S. Pat. No. 8,751,049 discloses a light bulb including therein a pico projector and a conventional camera.

US Patent Publication No. 20140035964 discloses a lighting system, wherein a master set includes a setting unit, an image information acquiring unit, a scene operation unit, a lighting/image selecting unit, an image information storing unit, a scene data storing unit, a display unit, an image signal output unit and a control unit. US Patent Publication No. 20140098303 discloses an illumination apparatus having an illumination function and an image projection function. US Patent Publication No. 20140043516 discloses a front projection electronic reader system including a projector system configured with an adjustable lens and a portable handheld reading screen. US Patent Publication No. 20130163232 discloses an image projection section having substantially the same configuration as a liquid-crystal projector.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides a projection device and a projection system including the projection device, the projection device and the projection system improving convenience in viewing images or operating lights.

Other objectives and advantages of the invention can be further illustrated by the technical features broadly embodied and disclosed as follows.

In order to achieve one or a part of or all of the above advantages or other advantages, an embodiment of the invention provides a projection system including an electronic device and a projection device. The electronic device is configured to provide a wireless signal. The projection device includes a wireless connection unit, a light sensor, a projection unit, an image control unit and a lamp base power interface. The wireless connection unit is configured to receive the wireless signal so as to provide an image control signal. The light sensor is configured to sense ambient light so as to provide a sensing control signal. The projection unit is configured to receive an image signal so as to project an image. The image control unit is configured to receive the image control signal and the sensing control signal so as to provide the image signal. The lamp base power interface is configured to electrically connect an external lamp stand power source to the projection device. When the projection system is in a first projection mode, the projection device is adapted to receive the wireless signal from the electronic device and project the image according to the wireless signal, or when the projection system is in a second projection mode, the image control unit is adapted to determine to turn off or turn on the projection unit according to the sensing control signal.

In an embodiment of the invention, the light sensor is adapted to provide the sensing control signal when the ambient light gradually increases so as to cause the image control unit to turn off the projection unit, or the light sensor is adapted to provide the sensing control signal when the ambient light gradually decreases, so as to cause the image control unit to turn on the projection unit.

In an embodiment of the invention, the electronic device is adapted to transmit the wireless signal to a wireless relay node, and the wireless relay node is adapted to transmit the wireless signal to the wireless connection unit.

In an embodiment of the invention, the electronic device is adapted to transmit the wireless signal to a cloud server, and the cloud server is adapted to transmit the wireless signal to the wireless connection unit.

In an embodiment of the invention, the electronic device is adapted to provide the wireless signal according to a user operation.

In an embodiment of the invention, when the user operation sets the projection system to the first projection mode, the electronic device is adapted to set up the projection unit through the wireless signal, so that the image projected by the projection unit comprises a color image, or when the user operation sets the projection system to the second projection mode, the electronic device is adapted to set up the projection unit through the wireless signal, so that the image projected by the projection unit comprises a pure-color image.

In an embodiment of the invention, when the user operation specifies a static image source, the electronic device is adapted to set up the projection unit through the wireless signal, so that the projection unit projects a static color image, or the user operation specifies a dynamic image source, the electronic device is adapted to set up the projection unit through the wireless signal, so that the projection unit projects a dynamic color image.

In an embodiment of the invention, a palette interface is adapted to pass at least one of color purity, color temperature and brightness of the pure-color image which the user operation specifies.

In an embodiment of the invention, when the user operation sets the projection system to off, the image control unit is adapted to turn off the projection unit and stop providing the image signal.

In an embodiment of the invention, when the user operation sets the projection system to a sleep operation mode and also sets a counting time, the image control unit is adapted to perform counting according to time so as to obtain a time count value, and the image control unit is adapted to determine whether to turn off the projection unit according to whether the time count value is equal to the counting time.

In an embodiment of the invention, when the time count value is equal to the counting time, the image control unit is adapted to control the image through the image signal, so as to cause the image to flicker and brightness of the image to gradually decrease.

In an embodiment of the invention, when the user operation sets the projection system to an alarm clock operation mode and also sets a notification time, the image control unit is adapted to determine to turn off or turn on the projection unit according to whether a current time is equal to the notification time.

In an embodiment of the invention, the projection system further comprises a speaker, the speaker being coupled to the image control unit so as to play a sound signal corresponding to the image.

In an embodiment of the invention, the projection system further comprises a lamp stand and an angle sensor. The lamp stand is connected to the lamp base power interface and configured to provide a connection between the external lamp stand power source and the projection device, and the lamp stand comprises an adjusting mechanism configured to adjust an inclination angle of the projection device. The angle sensor disposed in the projection device and configured to sense the inclination angle and to provide an angle signal to the image control unit, so that the image control unit corrects the image according to the angle signal.

In an embodiment of the invention, the image control unit is adapted to set the projection system to the first projection mode or the second projection mode according to the angle signal, when the projection system is in the first projection mode, the image projected by the projection unit is a color image, and when the projection system is in the second projection mode, the image projected by the projection unit is a pure-color image.

In an embodiment of the invention, the electronic device is adapted to obtain a notification time from a cloud server and transmit the wireless signal to the wireless connection unit at the notification time, so as to turn on the projection unit to project the image.

In an embodiment of the invention, the projection system further comprises a wearable device configured to sense a user's physiological information, wherein a signal of the wearable device is transmitted to the electronic device and then to the projection device, or the signal of the wearable device is directly transmitted to the projection device, so that the projection device controls the projection unit to project the image according to the physiological information.

An embodiment of the invention provides a projection device. The projection device is configured to receive a wireless signal provided by an electronic device. The projection device comprises a wireless connection unit, a light sensor, a projection unit, an image control unit and a lamp base power interface. The wireless connection unit is configured to receive the wireless signal so as to provide an image control signal. The light sensor is configured to sense ambient light so as to provide a sensing control signal. The projection unit is configured to receive an image signal so as to project an image. The image control unit is configured to receive the image control signal and the sensing control signal so as to provide the image signal. The lamp base power interface is configured to electrically connect an external lamp stand power source to the projection device. When the projection device is in a first projection mode, the projection device is adapted to receive the wireless signal from the electronic device and project the image according to the wireless signal, or when the projection device is in a second projection mode, the image control unit is adapted to determine to turn off or turn on the projection unit according to the sensing control signal.

Based on the above, according to the projection device and the projection system including the projection device of the embodiments of the invention, the electronic device sets up a projection mode or an operation mode of the projection device or an image projected by the projection device through a wireless signal, for user's ease of viewing of images and operation of lights.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that both the foregoing and other detailed descriptions, features and advantages are intended to be described more comprehensively by providing preferred embodiments accompanied with figures hereinafter. The drawings and descriptions will be regarded as illustrative in nature and not as restrictive. The use of "including", "comprising", or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The above and other technical contents, features and effects of the invention will become apparent in the following detailed description of several embodiments with reference to the accompanying drawings. In this regard, directional terminology, such as "top," "bottom," "front," "back," "left," or "right," etc., is used with reference to the orientation of the figure(s) being described. As such, the directional terminology is used for purposes of illustration and is in no way limiting. It is to be understood that other embodiment may be utilized and structural changes may be made without departing from the scope of the present invention. Also, it is to be understood that the phraseology and terminology used herein are for the purpose of description and should not be regarded as limiting.

Figure 1A:
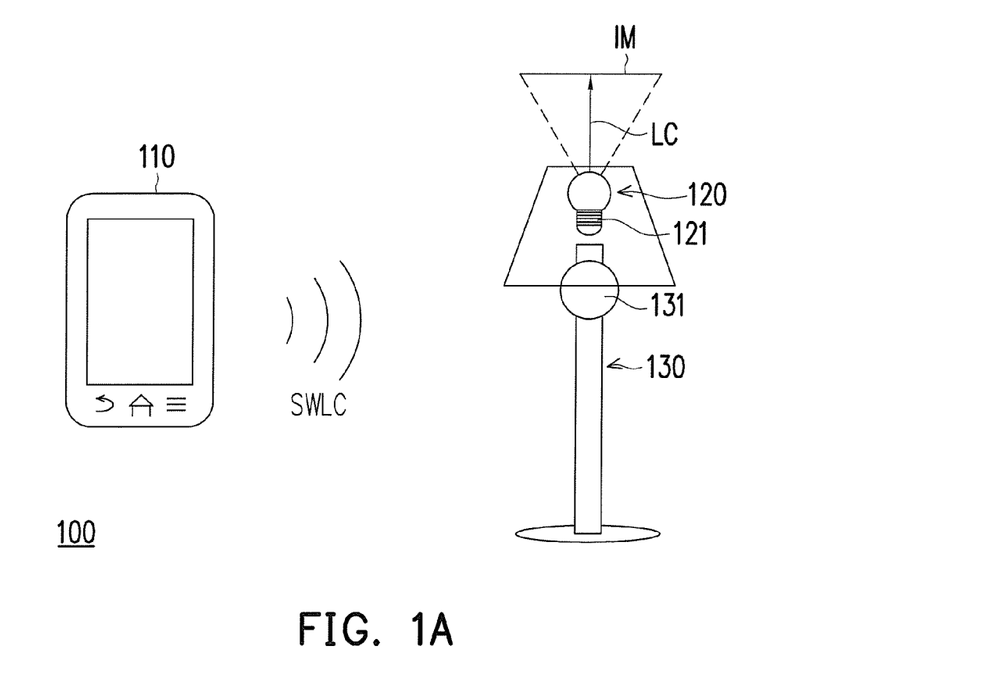
FIG. 1A is a system schematic view of a projection system according to an embodiment of the invention.
Figure 2A:
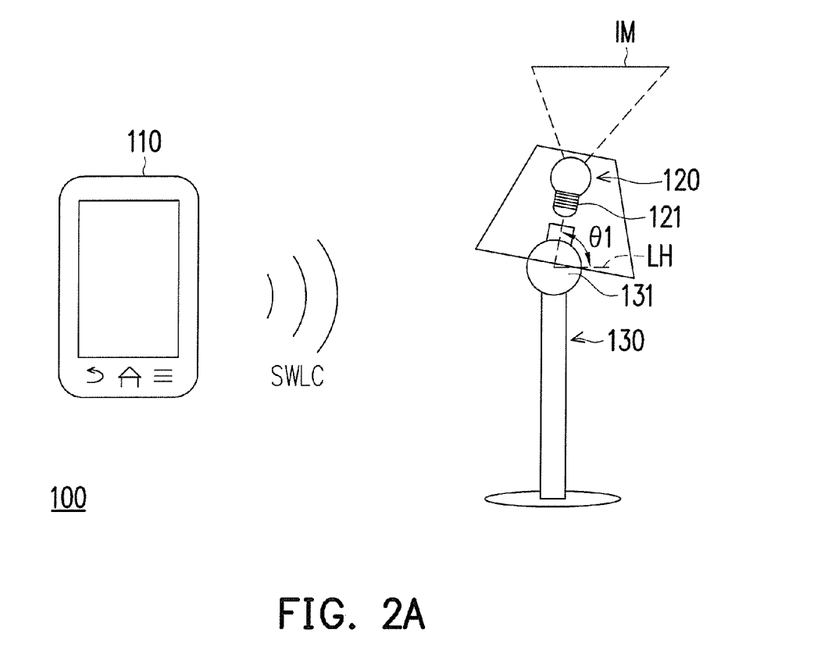
FIG. 2A is a system schematic view of a projection system according to an embodiment of the invention.
Figure 2B:
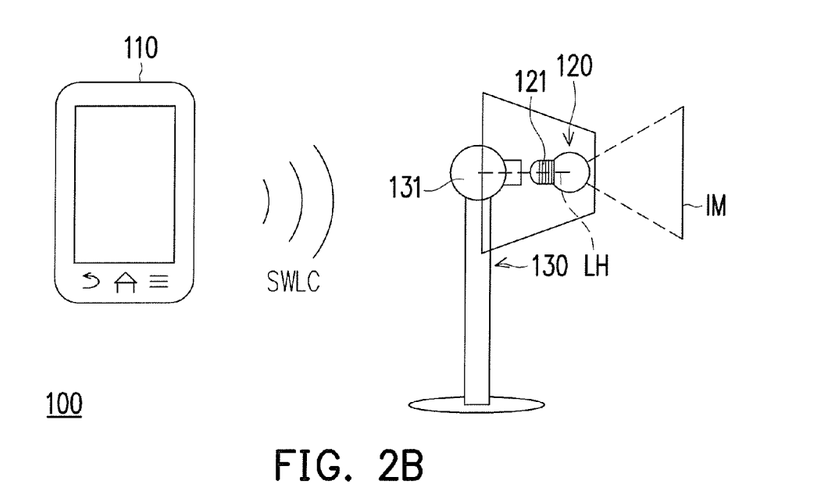
FIG. 2B is a system schematic view of a projection system according to an embodiment of the invention.

FIG. 1A is a system schematic view of a projection system according to an embodiment of the invention. FIG. 2A is a system schematic view of a projection system according to an embodiment of the invention. FIG. 2B is a system schematic view of a projection system according to an embodiment of the invention. Referring to FIGS. 1A, 2A and 2B, in the present embodiment, a projection system 100 includes an electronic device 110, a projection device 120 and a lamp stand 130. The electronic device 110 is configured to provide a wireless signal SWLC directly to the projection device 120, wherein the electronic device 110 provides the wireless signal SWLC according to a user operation. The wireless signal SWLC contains data such as a control command or a content of display image and so on. The electronic device 110 may be, but not limited to, a cell phone, a notebook computer, a desktop computer, or a tablet computer or the like. The projection device 120 is configured to provide an image IM, wherein the image IM is a color image or a pure-color image. Referring to FIGS. 2A and 2B together, the lamp stand 130 is configured to support the projection device 120, and to determine a projection angle (i.e. inclination angle θ1) of the projection device 120.

The projection device 120 has a lamp base power interface 121 disposed outside the projection device 120 for installing the projection device 120 onto the lamp stand 130. The lamp base power interface 121 may be, but not limited to, an Edison screw base, a bayonet base, a halogen base, a fluorescent base, or a midget flange base or the like in accordance with a lamp base standard such as E27, E26, E12, E14, B15, B22, G8, G9, etc. The lamp stand 130 is connected to the lamp base power interface 121 by matching the standard of the lamp base power interface 121, so as to provide an external lamp stand power source (not shown) to the projection device 120 through the lamp base power interface 121. Moreover, the lamp stand 130 has an adjusting mechanism 131 configured to adjust the inclination angle θ1 of the projection device 120 (i.e. a projection direction of the projection device 120). The adjusting mechanism 131 may be, but not limited to, a mechanism capable of two-dimensional adjustment or three-dimensional adjustment, such as a spindle type radial arm, a robotic joint, a ball joint, a flexible support, or a level adjustment base or the like.

Figure 1B:
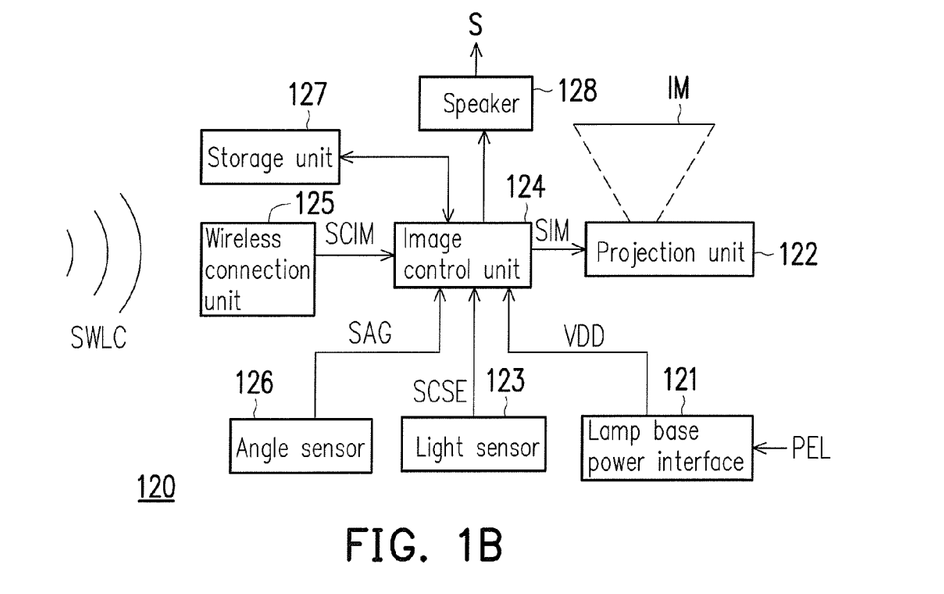
FIG. 1B is a system diagram schematic view of a projection device according to an embodiment of the invention.

FIG. 1B is a system diagram schematic view of a projection device according to an embodiment of the invention. Referring to FIGS. 1A and 1B, wherein the same or similar elements are denoted with the same or similar reference numerals. In the embodiment, the projection device 120 includes, e.g., the lamp base power interface 121, a projection unit 122, a light sensor 123, an image control unit 124, a wireless connection unit 125, an angle sensor 126, a storage unit 127 and a speaker 128.

The wireless connection unit 125 is configured to receive the wireless signal SWLC so as to provide an image control signal SCIM to the image control unit 124. The angle sensor 126 is disposed in the projection device 120, configured to sense the inclination angle θ1 of the projection device 120 and to provide an angle signal SAG to the image control unit 124. The light sensor 123 is configured to sense ambient light so as to provide a sensing control signal SCSE. The lamp base power interface 121 is configured to be electrically connected to an external lamp stand power source PEL, so as to provide an operation voltage VDD to the image control unit 124, wherein the external lamp stand power source PEL is a DC voltage or an AC voltage. However, embodiments of the invention are not limited thereto.

The storage unit 127 is configured to store parameters for operation of the projection device 120 or parameters of the projected image IM. The image control unit 124 is configured to receive the image control signal SCIM, the angle signal SAG, the sensing control signal SCSE and the operation voltage VDD, so as to accordingly determine a projection mode and an operation mode of the projection device 120 (i.e. the projection system 100) and to correspondingly provide an image signal SIM. The image control unit 124 obtains from the storage unit 127 a parameter (e.g., brightness, color purity or color temperature) corresponding to the image IM and a selected image source (e.g., an image file), so as to provide the image signal SIM to the projection unit 122. The selected image source is an image file transmitted from the electronic device 110 to the projection device 120, or an image file may build in the projection device 120. The projection unit 122 receives the image signal SIM so as to project the image IM. The speaker 128 is coupled to the image control unit 124, so as to release a sound signal S corresponding to the image IM.

Furthermore, when the projection system 100 is in a first projection mode, the projection device 120 receives the wireless signal SWLC from the electronic device 110, projects the image IM according to the wireless signal SWLC. Meanwhile, the projection device 120 does not determine to turn off or turn on the projection unit 122 according to the sensing control signal SCSE. In the first projection mode, the projection device 120 does not change projection conditions with variation in the ambient light. For example, the user may play a video in the first projection mode, and watch the video without interruption caused by variation in ambient light intensity.

When the projection system 100 is in a second projection mode, the image control unit 124 determines to turn off or turn on the projection unit 122 according to the sensing control signal SCSE. In other words, the light sensor 123 provides the sensing control signal SCSE when sensing that the ambient light gradually increases, so as to cause the image control unit 124 to turn off the projection unit 122; the light sensor 123 provides the sensing control signal SCSE when sensing that the ambient light gradually decreases, so as to cause the image control unit 124 to turn on the projection unit 122 to project the image IM. The sensing control signal SCSE may represent a brightness value, and the image control unit 124 sets a brightness threshold value for determining whether to turn on the projection unit 122. The brightness threshold value is stored in the storage unit 127. Moreover, determination of the first projection mode and the second projection mode may be designed by persons of ordinary skill in the art by themselves.

In an embodiment of the invention, the electronic device 110 provides the wireless signal SWLC according to the user operation, so as to set up the projection mode of the projection system 100. When the user operation sets the projection system 100 to the first projection mode, the electronic device 110 sets up the projection unit 122 through the wireless signal SWLC, so that the image IM projected by the projection unit 122 includes a color image; when the user operation sets the projection system 100 to the second projection mode, the electronic device 110 sets up the projection unit 122 through the wireless signal SWLC, so that the image IM projected by the projection unit 122 includes a pure-color image; when the user operation sets the projection system 100 to off, the image control unit 124 turns off the projection unit 122 and stops providing the image signal SIM. The color image and the pure-color image are stored in the storage unit 127. The user operation specifies at least one of color purity, color temperature and brightness of the pure-color image through a palette interface. The palette interface is displayed on the electronic device 110 (not shown). For example, colors for selection are presented in the form of a color level chart for allowing the user to directly select a desired color.

In addition, when the user operation specifies a static image source, the electronic device 110 sets up the projection unit 122 through the wireless signal SWLC, so that the projection unit 122 projects a static color image; when the user operation specifies a dynamic image source, the electronic device 110 sets up the projection unit 122 through the wireless signal SWLC, so that the projection unit 122 projects a dynamic color image.

When the user operation sets the projection system 100 to a sleep operation mode and also sets a counting time, the image control unit 124 performs counting according to time so as to obtain a time count value, and determines whether to turn off the projection unit 122 according to whether the time count value is equal to the counting time. In an embodiment of the invention, when the time count value is equal to the counting time, the image control unit 124 controls the image IM through the image signal SIM to cause the image IM to flicker and gradually decrease in brightness, in order to notify the user before turning off the projection unit 122.

When the user operation sets the projection system 100 to an alarm clock operation mode, the image control unit 124 determines to turn off or turn on the projection unit 122 according to whether a current time is equal to a notification time, so that the projection system 100 projects the image IM at fixed times or stops projecting an image at fixed times.

Referring to FIGS. 2A and 2B, in an embodiment of the invention, the image control unit 124 determines the projection mode according to the inclination angle θ1 of the projection device 120. That is, the image control unit 124 sets the projection system 100 to the first projection mode or the second projection mode according to the angle signal SAG. For example, in FIGS. 1A and 2B, when an angle between a central ray LC of the projected image IM and a horizontal line is less than 45 degrees, the image control unit 124 controls the projection system 100 so that the projection system 100 automatically enters the first projection mode. In FIGS. 1A and 2A, when the angle between the central ray LC of the projected image IM and the horizontal line is more than or equal to 45 degrees, the image control unit 124 controls the projection system 100 so that the projection system 100 automatically enters the second projection mode. In the embodiment, a threshold angle for distinguishing between the first projection mode and the second projection mode is 45 degrees. However, the threshold angle may be designed by persons of ordinary skill in the art by themselves, and the invention is not limited thereto.

Moreover, in FIG. 1B, the image control unit 124 corrects the image IM according to the angle signal SAG so as to prevent the projected image IM from trapezoidal distortion. In the embodiment, the angle sensor, e.g., a G-sensor or a gyroscope, senses an angle formed between a three-dimensional axial direction and ground, and transmits the angle signal SAG to the image control unit 124. The image control unit 124 then adjusts the image signal SIM through an internal algorithm to obtain an inverted image, so as to cause the image IM to become a rectangular frame by complementation. In another embodiment, correction of the image IM is implemented by mechanically adjusting a lens (not shown) of the projection unit 122 and causing up-down and left-right translational movements of the lens (not shown). However, the invention is not limited thereto. When the projection system 100 is in the first projection mode, the image control unit 124 controls the projection unit 122 to cause the projected image IM to be a color image; when the projection system 100 is in the second projection mode, the image control unit 124 controls the projection unit 122 to cause the projected image IM to be a pure-color image.

Figure 3:
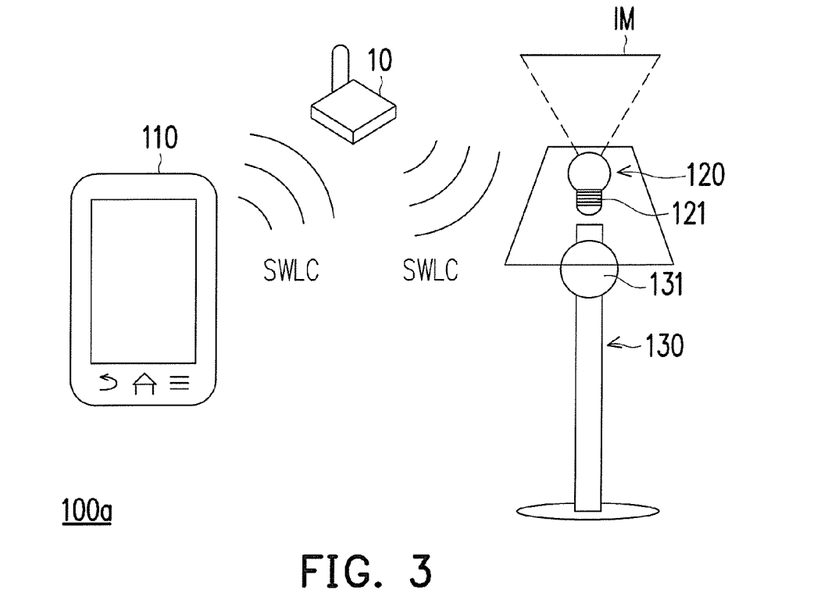
FIG. 3 is a system schematic view of a projection system according to another embodiment of the invention.

FIG. 3 is a system schematic view of a projection system according to another embodiment of the invention. Referring to FIGS. 1A, 1B and 3, wherein the same or similar elements are denoted with the same or similar reference numerals. In the present embodiment, the electronic device 110 of a projection system 100a transmits the wireless signal SWLC to a wireless relay node (i.e. repeater 10), and the wireless relay node 10 transmits the wireless signal SWLC to the wireless connection unit 125 of the electronic device 110.

Figure 4:
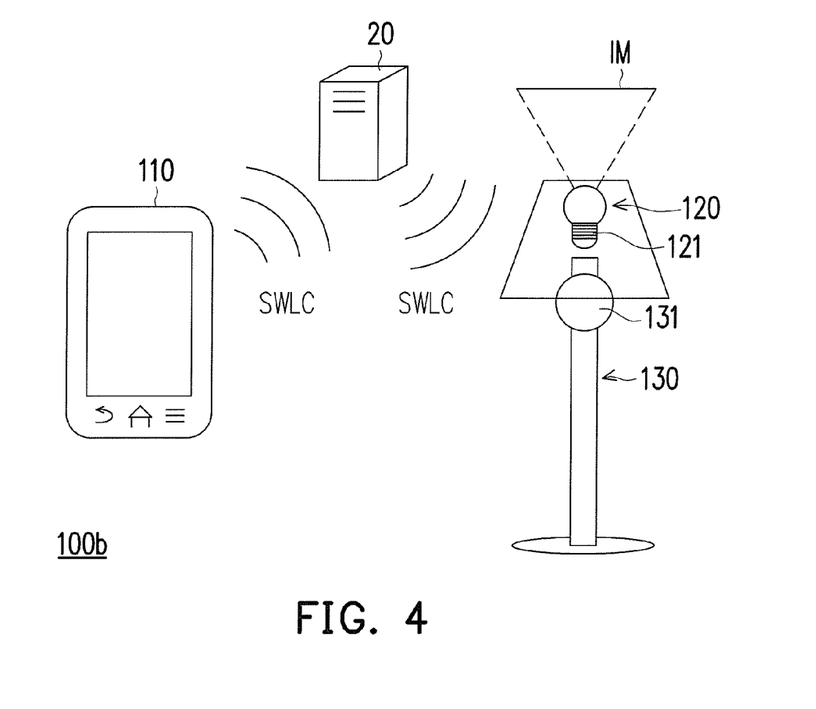
FIG. 4 is a system schematic view of a projection system according to still another embodiment of the invention.

FIG. 4 is a system schematic view of a projection system according to still another embodiment of the invention. Referring to FIGS. 1A, 1B and 4, wherein the same or similar elements are denoted with the same or similar reference numerals. In the present embodiment, the electronic device 110 of a projection system 100b transmits the wireless signal SWLC to a server or a cloud server 20, and the cloud server 20 transmits the wireless signal SWLC to the wireless connection unit 125 of the projection device 120, thereby achieving remote control.

Figure 5:
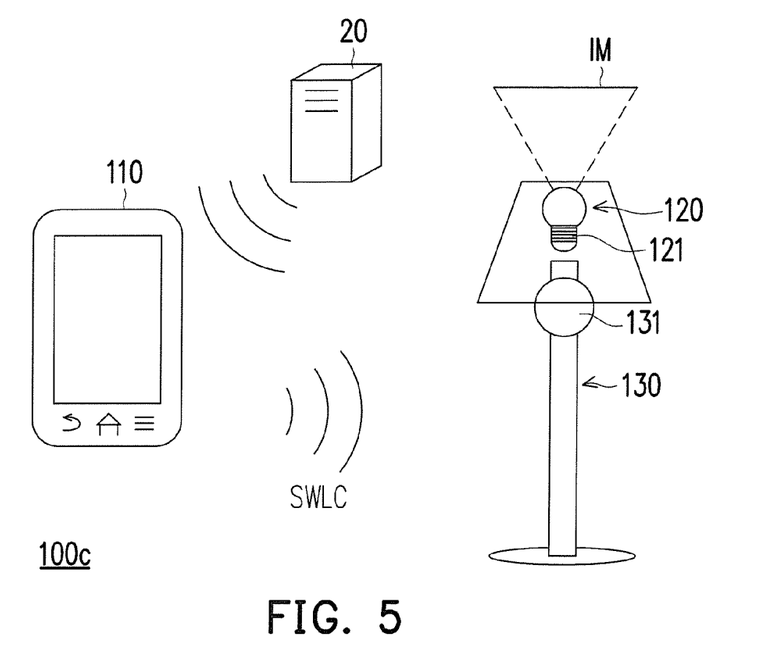
FIG. 5 is a system schematic view of a projection system according to still another embodiment of the invention.

FIG. 5 is a system schematic view of a projection system according to still another embodiment of the invention. In the present embodiment, the electronic device 110 obtains a notification time from the cloud server 20, and transmits the wireless signal SWLC to the wireless connection unit 125 at the notification time, so as to turn on the projection unit 122 to project the image IM. More specifically, when the user operation sets the projection system 100 to a calendar operation mode, the electronic device 110 is automatically connected to the cloud server 20 to obtain a calendar in the cloud server 20. Then, according to a schedule on the calendar and a set notification, the electronic device 110 transmits the wireless signal SWLC to the projection device 120 when a notification time arrives, so that the image control unit 124 turns on the projection unit 122 to project the image IM. At this moment, the image IM includes a notification in the form of specific text, graphics or sound for telling the user the schedule on the calendar.

Figure 6:
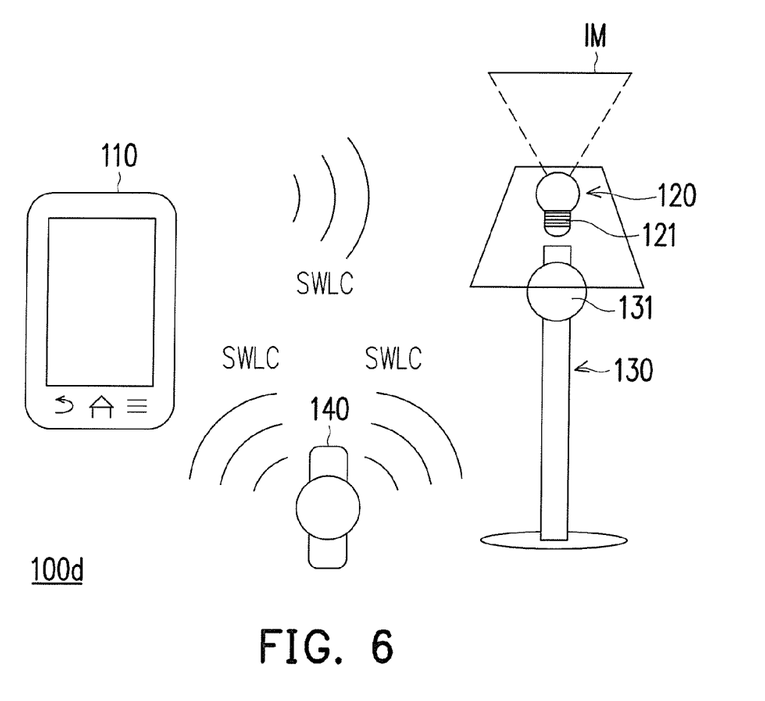
FIG. 6 is a system schematic view of a projection system according to still another embodiment of the invention.

FIG. 6 is a system schematic view of a projection system according to another embodiment of the invention. In an embodiment of the invention, the projection system 100 further includes a wearable device 140 configured to sense physiological information of the user, transmit a signal according to the physiological information, and to connect the signal to the electronic device 110 so as to be connected to the projection device 120 through the electronic device 110, or to directly connect the signal to the projection device 120, so as to control the projection unit 122 to project the image IM, wherein the connection of the signal is illustrated by taking the wireless signal SWLC as an example. However, the invention is not limited thereto. In the embodiment, the wearable device 140, e.g., a smart watch, an exercise bracelet, smart glasses, or a heart rate monitor or the like, detects the user's physiological information such as pulse, heart rate, blood pressure, body temperature, glucose level or behaviors and actions, and accordingly determines the user's conditions, so as to turn on and off the projection device 120 or to cause the projection device 120 to project a warning message according to the user's conditions. For example, during display of the image IM, when the wearable device 140 senses that the user has fallen asleep, the wearable device 140 turns off the projection device 120, and when the wearable device 140 senses that the user wakes up, the wearable device 140 turns on the projection device 120 so that the projection device 120 projects the image IM, thereby saving power. Or, in a home care environment, when something abnormal occurs in the user's physiological information such as heart rate, blood pressure, body temperature and so on, the projection device 120 projects a warning message to tell the user's family for ease of care.

Based on the above, to meet different user needs, a projection system (e.g., 100) according to an embodiment of the invention has several projection modes for switching, and projects a pure-color image and/or a color image according to a user operation. When a projection unit (e.g., 122) projects a pure-color image, optical properties such as color and brightness of the pure-color image are adjusted through a user operation. When the projection unit (e.g., 122) projects a color image, an electronic device (e.g., 110) transmits an image (e.g., a frame or a video) in the electronic device (e.g., 110) to a projection device (e.g., 120) through a wireless signal (e.g., SWLC), so that the projection device (e.g., 120) projects a corresponding image (e.g., IM). Moreover, the user turns off power of the projection device (e.g., 120) through the wireless signal (e.g., SWLC) so as to switch the projection device (e.g., 120) back to a standby mode. In other words, the projection system (e.g., 100) is quickly switched between projection modes by a user operation through the wireless signal (e.g., SWLC).

In an embodiment of the invention, the projection system (e.g., 100) may be applied in different situations. For example, when the second projection mode of the projection system (e.g., 100) is applied to indoor illumination, variation in the ambient light is sensed by the light sensor 123 so to enable automatic turn-on and turn-off of the projection system (e.g., 100), thereby achieving the power-saving purpose. In addition, the electronic device (e.g., 110) may be used for remote control of the projection device (e.g., 120), so as to adjust the optical properties such as color and brightness of an image, and further to provide different illumination lights and thereby create different atmospheres.

In addition, the first projection mode of the projection system (e.g., 100) may be applied to multimedia playing, so as to enable a user lying on a bed to watch a video or view a webpage by an image (e.g., IM) projected onto the ceiling, and to have music playing at the same time, and thereby enjoy audio-visual effects with a large screen. Also, the user may turn off the projection device (e.g., 120) by the electronic device (e.g., 110), i.e., switch the projection device (e.g., 120) to the standby mode. In addition, the projection system (e.g., 100) has a sleep operation mode and an alarm clock operation mode for multifunctional applications. For example, a projected image (e.g., IM) may be automatically darkened at fixed times or after a counting time, or an animation may be played by projecting images (e.g., IM) at fixed times for the purpose of reminding a child to go to bed.

The projection system (e.g., 100) may also be applied in home care for monitoring physiological information of a patient, an elderly or a child. Moreover, the family of the monitored person is notified upon detection of any unusual physiological information, and thus may timely provide proper assistance and care.

In summary, according to the projection device and the projection system including the projection device of the embodiments of the invention, the electronic device sets up a projection mode or an operation mode of the projection device or an image projected by the projection device through a wireless signal, for user's ease of viewing of images or operation of lights. In addition, the projection device is automatically switched between the projection modes according to an inclination angle (e.g., θ1).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection system, comprising:
   an electronic device configured to provide a wireless signal; and
   a projector, comprising:
      a wireless connection circuit configured to receive the wireless signal so as to provide an image control signal;
      a light sensor configured to sense ambient light so as to provide a sensing control signal;
      a projection optical engine circuitry configured to receive an image signal so as to project an image;
      an image controller circuitry configured to receive the image control signal and the sensing control signal so as to provide the image signal; and
      a lamp base power interface configured to electrically connect an external lamp stand power source,
   wherein the projector is adapted to be alternatively set up in one of a first projection and a second projection mode, and
   when the projector is in the first projection mode, the projector receives the wireless signal from the electronic device to project the image according to the wireless signal, and the image controller circuitry ignores determining to turn off or turn on the projection optical engine circuitry according to the sensing control signal, and
   when the projector is in the second projection mode, the image controller circuitry is adapted to determine to turn off or turn on the projection optical engine circuitry according to the sensing control signal.

2. The projection system according to claim 1, wherein the image controller circuitry is adapted to receive the sensing control signal provided by light sensor, and when the ambient light gradually increases, the image controller circuitry is configured to turn off the projection optical engine circuitry, or when the ambient light gradually decreases, the image controller circuitry is configured to turn on the projection optical engine circuitry.

3. The projection system according to claim 1, wherein the electronic device is adapted to transmit the wireless signal to a wireless relay node, and the wireless relay node is adapted to transmit the wireless signal to the wireless connection circuit.

4. The projection system according to claim 1, wherein the electronic device is adapted to transmit the wireless signal to a cloud server, and the cloud server is adapted to transmit the wireless signal to the wireless connection circuit.

5. The projection system according to claim 1, wherein the electronic device is adapted to provide the wireless signal according to a user operation.

6. The projection system according to claim 5, wherein when the user operation sets the projection system to the first projection mode, the electronic device is adapted to set up the projection optical engine circuitry through the wireless signal, so that the image projected by the projection optical engine circuitry comprises a color image, or when the user operation sets the projection system to the second projection mode, the electronic device is adapted to set up the projection optical engine circuitry through the wireless signal, so that the image projected by the projection optical engine circuitry comprises a pure-color image.

7. The projection system according to claim 6, wherein when the user operation specifies a static image source, the electronic device is adapted to set up the projection optical engine circuitry through the wireless signal, so that the projection optical engine circuitry projects a static color image, or the user operation specifies a dynamic image source, the electronic device is adapted to set up the projection optical engine circuitry through the wireless signal, so that the projection optical engine circuitry projects a dynamic color image.

8. The projection system according to claim 6, wherein a palette interface is adapted to pass at least one of color purity, color temperature and brightness of the pure-color image which the user operation specifies.

9. The projection system according to claim 5, wherein when the user operation sets the projection system to off, the image controller circuitry is adapted to turn off the projection optical engine circuitry and stop providing the image signal.

10. The projection system according to claim 5, wherein when the user operation sets the projection system to a sleep operation mode and also sets a counting time, the image controller circuitry is adapted to perform counting according to time so as to obtain a time count value, and the image controller circuitry is adapted to determine whether to turn off the projection optical engine circuitry according to whether the time count value is equal to the counting time.

11. The projection system according to claim 10, wherein when the time count value is equal to the counting time, the image controller circuitry is adapted to control the image through the image signal, so as to cause the image to flicker and brightness of the image to gradually decrease.

12. The projection system according to claim 5, wherein when the user operation sets the projection system to an alarm clock operation mode and also sets a notification time, the image controller circuitry is adapted to determine to turn off or turn on the projection optical engine circuitry according to whether a current time is equal to the notification time.

13. The projection system according to claim 1, wherein the projection system further comprises a speaker, the speaker being coupled to the image controller circuitry so as to play a sound signal corresponding to the image.

14. The projection system according to claim 1, wherein the projection system further comprises an angle sensor, and a lamp stand comprises an adjusting mechanism configured to adjust an inclination angle of the projector,
   the angle sensor disposed in the projector and configured to sense the inclination angle and to provide an angle signal to the image controller circuitry, so that the image controller circuitry corrects the image according to the angle signal.

15. The projection system according to claim 14, wherein the image controller circuitry is adapted to set the projection system to the first projection mode or the second projection mode according to the angle signal, when the projection system is in the first projection mode, the image projected by the projection optical engine circuitry is a color image, and when the projection system is in the second projection mode, the image projected by the projection optical engine is a pure-color image.

16. The projection system according to claim 1, wherein the electronic device is adapted to obtain a notification time from a cloud server and transmit the wireless signal to the wireless connection circuit at the notification time, so as to turn on the projection optical engine circuitry to project the image.

17. The projection system according to claim 1, wherein the projection system further comprises:

a wearable device configured to sense a user's physiological information, wherein a signal of the wearable device is transmitted to the electronic device and then to the projector, or the signal of the wearable device is directly transmitted to the projector, so that the projector controls the projection optical engine circuitry to project the image according to the physiological information.

18. A projector configured to receive a wireless signal provided by an electronic device, the projector comprising:

a wireless connection circuit configured to receive the wireless signal so as to provide an image control signal;

a light sensor configured to sense ambient light so as to provide a sensing control signal;

a projection optical engine circuitry configured to receive an image signal so as to project an image;

an image controller circuitry configured to receive the image control signal and the sensing control signal so as to provide the image signal; and a lamp base power interface configured to electrically connect an external lamp stand power source, wherein the projector is adapted to be alternatively set up in one of a first projection and a second projection mode, and when the projector is in the first projection mode, the projector receives the wireless signal from the electronic device to project the image according to the wireless signal, and the image controller circuitry ignores determining to turn off or turn on the projection optical engine circuitry according to the sensing control signal, and when the projector is in the second projection mode, the image controller circuitry is adapted to determine to turn off or turn on the projection optical engine circuitry according to the sensing control signal.

* * * * *